(12) United States Patent
Frantz

(10) Patent No.: US 7,821,876 B2
(45) Date of Patent: Oct. 26, 2010

(54) SYNCHRONIZATION OF A PLURALITY OF DEVICES IN A WIRELESS SENSOR ARRANGEMENT

(76) Inventor: Frederick E. Frantz, 10716 Elmbrook Ct., Raleigh, NC (US) 27614

( * ) Notice: Subject to any disclaimer, the term of this patent is extended or adjusted under 35 U.S.C. 154(b) by 520 days.

(21) Appl. No.: 11/538,943

(22) Filed: Oct. 5, 2006

(65) Prior Publication Data

US 2007/0202801 A1      Aug. 30, 2007

Related U.S. Application Data

(60) Provisional application No. 60/777,274, filed on Feb. 27, 2006.

(51) Int. Cl.
*G04C 11/02* (2006.01)
(52) U.S. Cl. .................................................. 368/47
(58) Field of Classification Search .................. 455/507
See application file for complete search history.

(56) References Cited

U.S. PATENT DOCUMENTS

| | | | | |
|---|---|---|---|---|
| 3,916,214 | A | * | 10/1975 | Coble et al. .................. 307/119 |
| 4,074,117 | A | * | 2/1978 | DeLorean et al. .............. 377/20 |
| 4,263,736 | A | * | 4/1981 | Beierwaltes et al. .......... 40/452 |
| 4,582,434 | A | | 4/1986 | Plangger et al. |
| 4,823,367 | A | * | 4/1989 | Kreutzfeld ................. 377/24.2 |
| 5,036,518 | A | * | 7/1991 | Tseung ..................... 714/748 |
| 5,125,010 | A | * | 6/1992 | Lee et al. ................... 377/24.2 |
| 5,422,863 | A | | 6/1995 | Minowa et al. |
| 5,436,611 | A | | 7/1995 | Arlinghaus, Jr. |
| 5,511,045 | A | | 4/1996 | Sasaki et al. |
| 5,685,722 | A | * | 11/1997 | Taba .......................... 434/254 |
| 5,812,049 | A | | 9/1998 | Uzi |
| 5,831,940 | A | | 11/1998 | Gillette |
| 6,069,887 | A | | 5/2000 | Geiger et al. |

(Continued)

FOREIGN PATENT DOCUMENTS

JP      56155887 A   * 12/1981

OTHER PUBLICATIONS

USA Swimming; "Times & Recognition Committee Conference Call Minutes—Sep. 10, 2008, 8 p. m."; retrieved on Jun. 19, 2009 from http://goggleawards.org/USASWeb/_Rainbow/Documents/e03abe02-2d9c-46ab-b6e5-c35afe482790/T%20and%20R%20Committee%20Minutes%20September%2011%202008doc.pdf.

(Continued)

*Primary Examiner*—Dwayne D Bost
*Assistant Examiner*—Joseph Dean, Jr.
(74) *Attorney, Agent, or Firm*—Robert H. Frantz

(57) ABSTRACT

Two or more wirelessly networked devices for control or data acquisition functions for real-time application are provided with a error corrected synchronization and data collection process. A single start device transmits a start message, followed by each stop device acknowledging that start message. If one or more stop devices fails to acknowledge the initial start message, one or more start messages are transmitted including an elapsed time since the initial start message. Each stop device receives the initial start message and any subsequent start messages, using the elapsed time in the start message to synchronize a local timer. Upon stop event detection, each stop device records its local timer value and subsequently transmits that value to a collection device or console.

22 Claims, 12 Drawing Sheets

U.S. PATENT DOCUMENTS

| | | | |
|---|---|---|---|
| 6,369,697 | B1 | 4/2002 | Poole |
| 6,539,489 | B1 | 3/2003 | Reinert |
| 6,738,917 | B2 | 5/2004 | Hummel et al. |
| 6,747,996 | B2 | 6/2004 | Holloway et al. |
| 7,029,170 | B2 | 4/2006 | Bailey |
| 2003/0012212 | A1* | 1/2003 | Earnshaw et al. .......... 370/428 |
| 2004/0213087 | A1 | 10/2004 | Gillette et al. |
| 2005/0135193 | A1* | 6/2005 | Kaski ......................... 368/10 |
| 2005/0243651 | A1 | 11/2005 | Balley |
| 2006/0017230 | A1 | 1/2006 | Abdulkader |
| 2006/0176216 | A1 | 8/2006 | Hipskind |
| 2007/0076528 | A1* | 4/2007 | Kirby ......................... 368/47 |
| 2008/0238657 | A1* | 10/2008 | Hupp et al. .............. 340/539.1 |

OTHER PUBLICATIONS

Barker College (Australia); "Swimming News", Apr. 2009, retrieved on Jun. 19, 2009 from http://www.barker.nsw.edu.au/files_cms/169_Microsoft%20Word%20-%20April%20Newsletter09.pdf.

Barker College (Australia); "Swimming News", http://www.barker.nsw.edu.au/files_cms/147_Newsletter%20February%20styled.pdf.

Colorado Time Systems (Colorado); "CTS' Dolphin System Approved by USA Swimming for Three Levels", retrieved on Jun. 19, 2009 from http://www.updatefrom.com/cts/0818/ask.htm.

Colorado Time Systems (Colorado); "America, Brazil, China", retrieved on Jun. 19, 2009 from http://www.provensystems.com/cts/0710/around.html.

Hobcaw Yacht Club; "Hobcaw Marlins Swim Team 2009 Handbook", retrieved on Jun. 19, 2009 from http://www.hobcawyachtclub.org/SwimTeam/2009/09_hyc_handbook.pdf.

South Texas Masters Swimming; "Nitro Masters Mar. 1 Meet"; retrieved on Jun. 19, 2009 from http://www.southtexasmastersswimming.corn.

South Texas Swimming;; "Nitro Last Chance Time Trials", retrieved on Jun. 19, 2009 from http://www.stswim.org/2008/ST-08-16.pdf.

Northern Area Aquatics Committee; "2009 Northern Area Championship Meet"; retrieved Jun. 19, 2009 from http://www.stingrayswim.org/Assets/Meet%20Invites/28262_NA%20Champs%202009%20Invite.pdf.

Virginia Swimming; RPST A/BB/B/C Meet, retrieved on Jun. 19, 2009 from http://www.virginiaswimming.com.

Seastars; "2007 Fall Open Swim Meet", retrieved on Jun. 19, 2009 from http://www.seastaraquatics.org.

Smokerise Sharks Swim Club (Stone Mountain, GA); "Sharkbite", retrieved on Jun. 19, 2009 from http://smokerisesharks.com/Newsletters/SharkBite061807.pdf.

SWIMCLUB.CO.UK; "Dophin Wireless Timing" forum thread; retrieved on Jun. 19, 2009 from http://www.swimclub.co.uk/forum/showthread.php?p=110503.

Wireless Timing International, "Wireless Swimming Timing System <Allstar>", downloaded on Jan. 9, 2006 from http://www.wirelesstimingintl.com.

* cited by examiner (a)

(b)

(c)

SYNCHRONIZATION OF A PLURALITY OF DEVICES IN A WIRELESS SENSOR ARRANGEMENT

This application claims benefit under 35 U.S.C. §119(e) to the filing date of U.S. provisional patent application No. 60/777,274, filed on Feb. 27, 2006, by Frederick E. Frantz.

BACKGROUND OF THE INVENTION

1. Technical Field of the Invention

This invention relates to the fields of synchronized sensor arrangements, and especially to those arrangements wherein the sensors are physically distant from each other and in which wired interconnection is contraindicated.

2. Background of the Invention

Traditional control and data acquisition systems use integrated components or remote devices that are connected with wired signals. Such systems are applied to a variety of distributed components where it is desired to measure time from a synchronized starting time, such as industrial controls, scientific equipment, food preparation, and sporting event judging systems. A cyclic event in a control and data acquisition application is initiated by a specified start condition that is used to define the beginning of the event. It is highly desirable that all devices in the system are synchronized with the occurrence of the start condition so that the control functions and data acquisition are also synchronized system wide.

For example, as shown in FIG. 4, a swimming meet (30) is conducted in a swimming pool (31) which is divided into a number of swimming lanes. Contestants (e.g. swimmers in this example) start the event in a synchronized manner, such as the firing of a starter pistol, ringing of a bell, or dropping of a flag. In many arrangements, there is a starting official (33) equipped with a starter device, which is wired (34) to a judges' console (38), attended by and operated by one or more judges (39).

When the event is synchronously started, a signal is sent from the starting device to the judges' console via the wire (34), which triggers the start of a timer within the console. In a swimming event, each lane is provided with an individual finish judge (35), who is equipped with a stopping device, such as a control (36) wired (37) to the judges' console (38). When each lane judge determines that the contestant assigned to his or her lane has completed the event, the lane judge activates the control, which sends a signal via the wire (37) to the console. Upon receipt of each stopping device control signal, the console records or marks the timer value for that lane or contestant.

Such a wired system provides start synchronization for all stopping sensors by using a single, centralized timer, from which stop times are read. However, such wired systems can be difficult to install, especially on a temporary basis. For this swimming event example, the wires may have to be draped or dressed considerable distances to circumnavigate a pool perimeter, diving platforms, spectator seating, etc. As water is a pervasive substance, wired systems intended for installation in wet conditions require expensive sealant and containment technologies to achieve a durable product. Further, safety may be comprised for swimmers, operators, judges, etc., who must move about the area in which the timer system is installed, as draped cables may pose a tripping hazard, and may interfere with water drainage paths.

In other applications, such as industrial controls or scientific equipment the corresponding installation, reliability, and safety issue may be present for wired systems. For example, installation of a distributed, wired sensor system may require draping or dressing of cables around or above dangerous equipment, reliability may be challenged by the existence of liquid or vaporous substances such as acids or solvents, and safety may be compromised by causing tripping or drainage issues.

SUMMARY OF THE INVENTION

The system according to the present invention consists of two or more devices that provide control functions, data acquisition functions, or both, for application with a real-time process. The devices communicate with each other via a wireless interface that includes hardware that may provide message prioritization, frequency hopping, and collision detection. One of the devices is configured to detect a condition that initiates an event cycle and transmits a start message to the other devices. The other devices in the system initiate their functions based on the start message. The system and method of the present invention provide for a reliable method to distribute or broadcast a start signal, which is acknowledged by each stopping device. An error control provision allows for a stopping device to miss a start signal, and to recover from the missed start signal without having to restart the entire cyclical event.

BRIEF DESCRIPTION OF THE DRAWINGS

The figures presented herein when taken in conjunction with the disclosure form a complete description of the invention.

DETAILED DESCRIPTION OF THE INVENTION

The use of consoles, a start device, and multiple stop devices with wireless interfaces on first consideration provide some advantages to wired systems, including less complicated installation, more flexibility, and reduction of cables. However, the inventors of the present system have overcome several technical challenges which may present themselves to wireless systems depending on the operating environment.

For example, in an industrial environment, wireless signals may experience significant interference generated by powerful electro-magnets, relays, electrical motors, and multi-path effects. The probability of one or more devices missing a transmitted start message is effectively handled using the solutions provided by the present invention.

Further, in certain applications such as sporting events, if a particular event is not accurately timed on the first run or first execution, it is not feasible or equitable to rerun the event due to an equipment failure or malfunction. As such, the inventors of the present invention have also solved several problems regarding maintaining complete synchronization between multiple wireless timing devices, and compensating for delays inherent in message encoding, transmission, and decoding processes.

Figure 1:
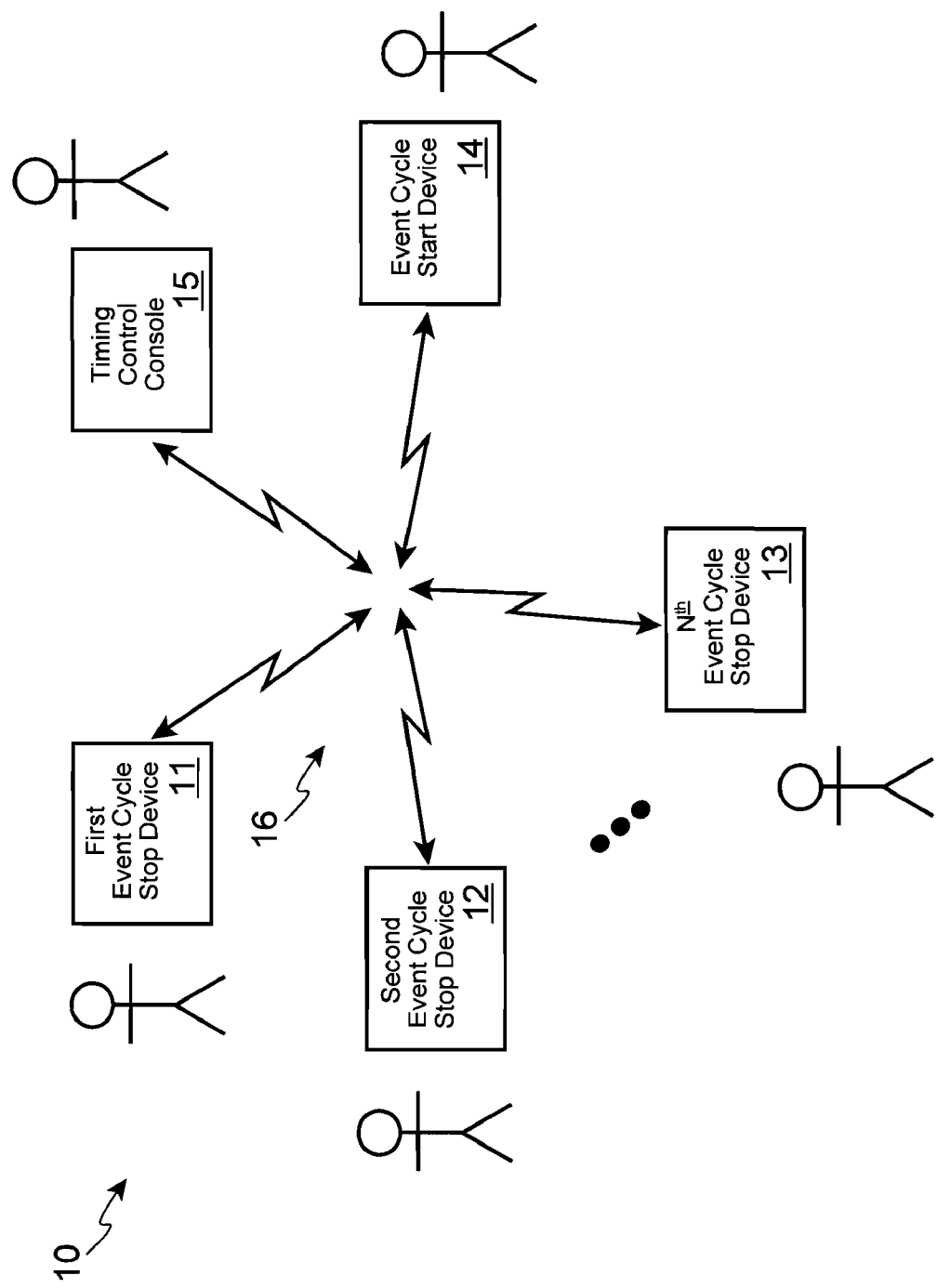
FIG. 1 depicts an arrangement of components according to the present invention.

Turning to FIG. 1, a generalized arrangement (10) of components according to the present invention is shown, including multiple event cycle stop devices (11, 12, 13), a single event cycle start device (14), and a timing control console (15). In a sporting event application, the stop devices and the start device may be suitably sized as a handheld device with a human-operable button or key, while the timing control console may be a console having one or more keys, buttons, and indicators such as light-emitting diode ("LED"), liquid crystal display ("LCD"), or a graphical display. Each component in the arrangement (10) is provided with a wireless interface to a wireless communications network (16), such as a radio frequency ("RF") network employing channels, carriers, or packets, optionally including Wireless Fidelity ("WiFi") or BlueTooth, or such as an optical wireless interface optionally including InfraRed Data Arrangement ("IrDA").

Event Cycle Start Process

In general, according to the invention, if any of the devices in the system do not correctly receive the initial start message from the timing control console, then those devices must be synchronized to the others as quickly as possible. Once the start message is received, the individual device is responsible for maintaining synchronization with the other devices by using an internal clock source. The synchronization method employed preferably minimizes the amount of overhead on the remote devices to allow them maximum bandwidth for processing collected data and control functions.

The aforementioned synchronization problem is solved by requiring the start detection device, or the console device, to verify that all the other devices in the system received the start message and by including a time value in the start message. The time value indicates the elapsed time from the initial start condition, and is set to zero for the initial start message.

All devices are required to have a circular data buffer or functionally equivalent buffer that is constantly updated. The size of the buffer determines the time limit for resynchronization in the case of a loss of the initial start message.

Figure 5:
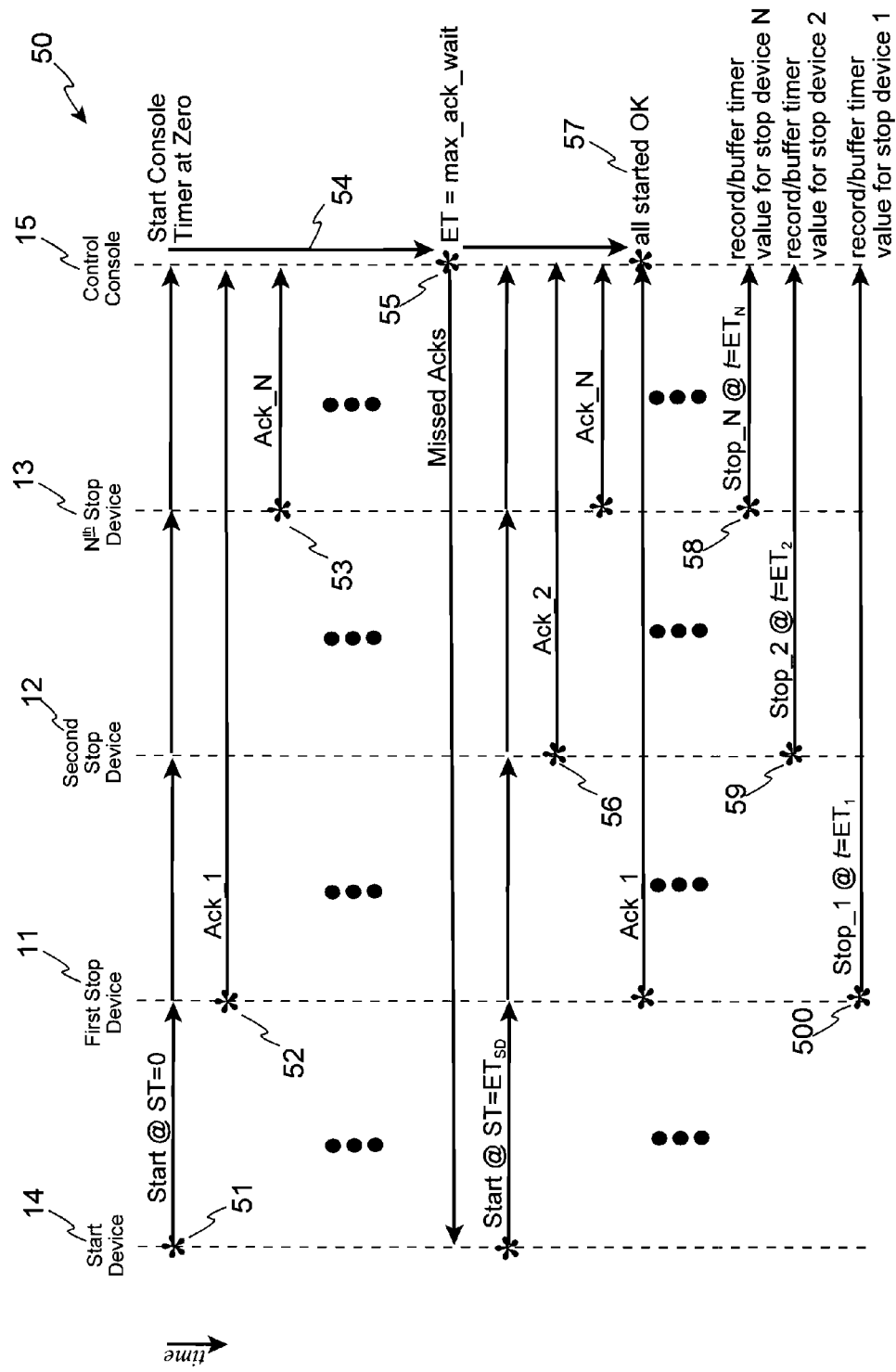
FIG. 5 shows an example communications timeline to illustrate the operation of a system according to the present invention.

The following generalized logical process is used by the devices to synchronize the system, as illustrated in the timing diagram (50) of FIG. 5:

(a) the start condition (e.g. a button or key activation, relay closure, etc.) is detected by a start device (14), which in turn transmits (51) the initial start message with an elapsed time value of zero (ST=0);

(b) each stop device receives the initial start message, initializes each local stop device timer to a value of zero (or an alternate start value), begins running each local timer, and optionally begins to collect other data and/or output other controls;

(c) the control console waits for a sufficient period max_ack_wait to receive all acknowledgments Ack_1 through Ack_N (52, 53) from all of the stop devices;

(d) if the max_ack_wait period (54) expires without receiving acknowledgments from all the devices, the console transmits a Missed_Acks (55) message to the start device indicating one or more acknowledgments were not received;

(e) the start device receives the missed acknowledgments message (55), and transmits another start message with the appropriate elapsed time value, wherein the elapsed time value is the elapsed time value measured by timer local to the start device itself $ST=ET_{SD}$;

(f) upon receipt of a start message with the non-zero $ET_{SD}$ elapsed time value, each stop device which is not already running loads its current local timer value to equal the elapsed time value $ET_{SD}$ of the start device, starts its timer running, and then transmits an acknowledgment message, such as Ack_2 (56), which is received by the control console, and each running stop device can optionally reload its timer to the elapsed time value $ET_{SD}$ of the start device, and transmit and acknowledgment message, as well;

(g) the resynchronization attempts continue until all devices have acknowledged (57) the start message or a retry limit is exceeded and an error is declared; and (h) the console device collects the stop values from the individual stop devices, after which the values are optionally processed according to a predetermined algorithm to determine rank or other criteria.

As such, principles of operation for synchronous timing of the event according to the invention are that a stop device acknowledges each start message, since its acknowledgment message may not have been received earlier by the console device, and a remote device uses the elapsed time value in the start message to synchronize its local processing.

Further according to another embodiment, the start device is designated as the authoritative start time keeper, so it is assigned the task of retransmitting start messages until all stop device have successfully acknowledged the start operations.

In another embodiment, the functionality of the start device and the stop device may be combined into a single device for certain applications and intended uses.

System-Level Error Detection and Correction

According to the example of FIG. 5, the second stop device (12) misses or fails to acknowledge the initial start message, but it is re-synchronized by the second start message. In this way, steps (d) through (g) comprise an error detection and correction scheme at the system level, distinct from any error correction and detection mechanism in the message protocol level, such as Carrier Sense Multiple Access ("CSMA") with collision detection ("CD").

Alternatively, the start device can periodically or even randomly transmit start messages containing the start device's elapsed time value. Using this method, even if the Missed_Acks (55) message is not received by the start device, the stop devices will eventually receive a new start message with a time value to which synchronize their local timers.

Event Cycle Stop Process

Once the event is successfully started, individual stop devices collect data (e.g. operate their local timers, buffer received data from A/D converters, etc.), and execute control functions based on an internal clock source. As each stop device is activated, such as by the operation of a key or button by a human operator, the current time of the local timer is saved and stored for transmission to the control console, which may be accomplished immediately, or at a later time upon polling from the control console.

At the conclusion of the event cycle, the stop devices transfer the collected data to the control console, preferably initiated by a polling request from the console device. Optionally, the messages are time stamped to indicate their locations in the overall event sequence. One time stamp can be added by each stop device before its stop message is transmitted, and optionally a second time stamp can be added to the message at the time it is received by the console device.

Post processing of the collected data from all the stop devices can be performed by the control console using the time stamped information provided by the remote devices. Lists of messages, or their contents formatted for human readability, can be produced in order for judges or technical personnel to examine them. For example, they can be sorted by time stamp value, by sending device, by time or receipt, or by message type (e.g. start, stop, re-start, etc.). Time stamped information may also be formatted and output for use by other processes or machines, as well.

Using the time stamping mechanism of the invention allows the messages to be transferred between the devices asynchronously, and it relieves criticality of transferring messages in real-time. By sorting and ordering the messages using the time stamps as a sort or order criterion, the stop times can be positioned in a list or display relative to the start time.

Transmission and Coding Delay Compensation

For applications of the present invention, the delays caused by message transmission and reception, including encoding and decoding times, are typically negligible. However, in some applications, these times may be significant relative to the required timer resolution. In these more precise applications, an optional embodiment includes compensating the timer values for these delays, which we will collectively refer to as transmission delays.

For example, in the controller, when a start message is received, the maximum elapsed time value to wait for reception of all acknowledgment messages can be decreased by the estimated transmission delay, or the start time in the start message can be increased by the transmission delay.

Exemplary Logical Processes

Generally, when a start condition is detected, the initial transmit message indicating an elapsed time value of zero is transmitted, followed by a wait to receive acknowledgments from all stop devices. If one or more stop devices fail to acknowledge the initial start message, or subsequent start messages, start messages are transmitted containing the current elapsed time according to an authoritative start timer, until all stop devices have successfully acknowledged a start message, or until a maximum number of retries has been made.

Likewise, each stop device waits to receive a start message, following the receipt of which an acknowledgment is transmitted, and a local timer is started from an initial value indicated in the received start message, or an already initiated timer is either updated to synchronize it with the value in the start message or allow it to continue to free run. This continues, until the stop device detects a stop condition, such as the activation of a button or key, closure of a relay, etc. The stop device then transmits its stop value with an identifier of the transmitting stop device, optionally buffering the stop value until polled for collection by the control console.

FIGS. 7a-9c show coupled, state-driven logical processes for the start device, the control console, and the stop devices, according to the present invention, and further illustrating the foregoing descriptions as follows:

Stop Device Processes:

FIG. 7a shows processing of messages received from a Control device;

FIG. 7b shows processing for messages received from a Starter device;

FIG. 7c depicts processing of operation of the Start button;

FIG. 7d illustrates processing of operation of the Stop button;

Control Device Processes:

FIG. 8a illustrates processing for messages received from the Stop Devices;

FIG. 8b shows processing for messages received from a Starter Device; and

FIG. 8c shows background and error detection processing;

Start Device Processes:

FIG. 9a depicts processing for messages received from a Control Device;

FIG. 9b shows processing related to operation of a Start trigger or button; and

FIG. 9c illustrates processing related to operation of a Stop button.

In these exemplary logical processes, three system states exist:

| | |
|---|---|
| RESET: | Stop Devices and Starter Device are initialized but not active. |
| RUN: | The local timers for the Stop Devices are active and incrementing. |
| STOP: | The local timers for the Stop Devices are active but not incrementing. |

Communications Protocol

One available embodiment of the invention comprehends that multiple stop devices may attempt to transmit their acknowledgments and/or their stop times simultaneously to each other, thereby causing contention for a transmission resource such as an RF channel or optical carrier. Using a protocol which provides for collision detection and resolution can be preferable in such an embodiment, such as Simple Media Access Control ("SMAC"), IEEE 802.15.4, or ZigBee™ protocols (or layers of protocol stacks).

It will be readily understood by those skilled in the relevant arts that other open or standard protocols may be employed, as well as proprietary protocols may be used for the functional purposes of the invention, without departing from the spirit and scope of the invention.

Example Device Block Diagram

Figure 6:
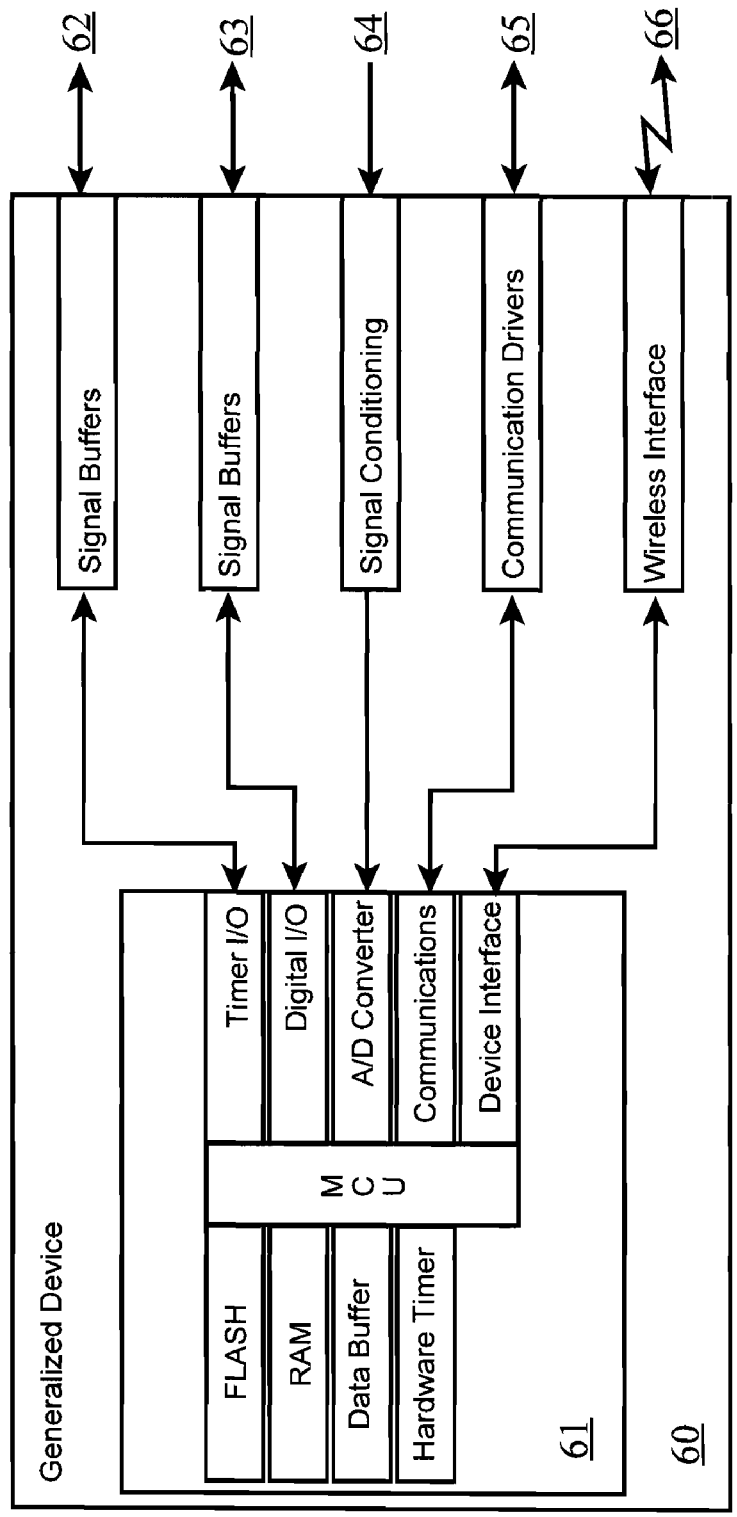
FIG. 6 shows a block diagram of a generalized device which can be configured as a start device, a stop device, a control device, a data acquisition device, a timer device, or a console device according to the present invention.
Figure 7:
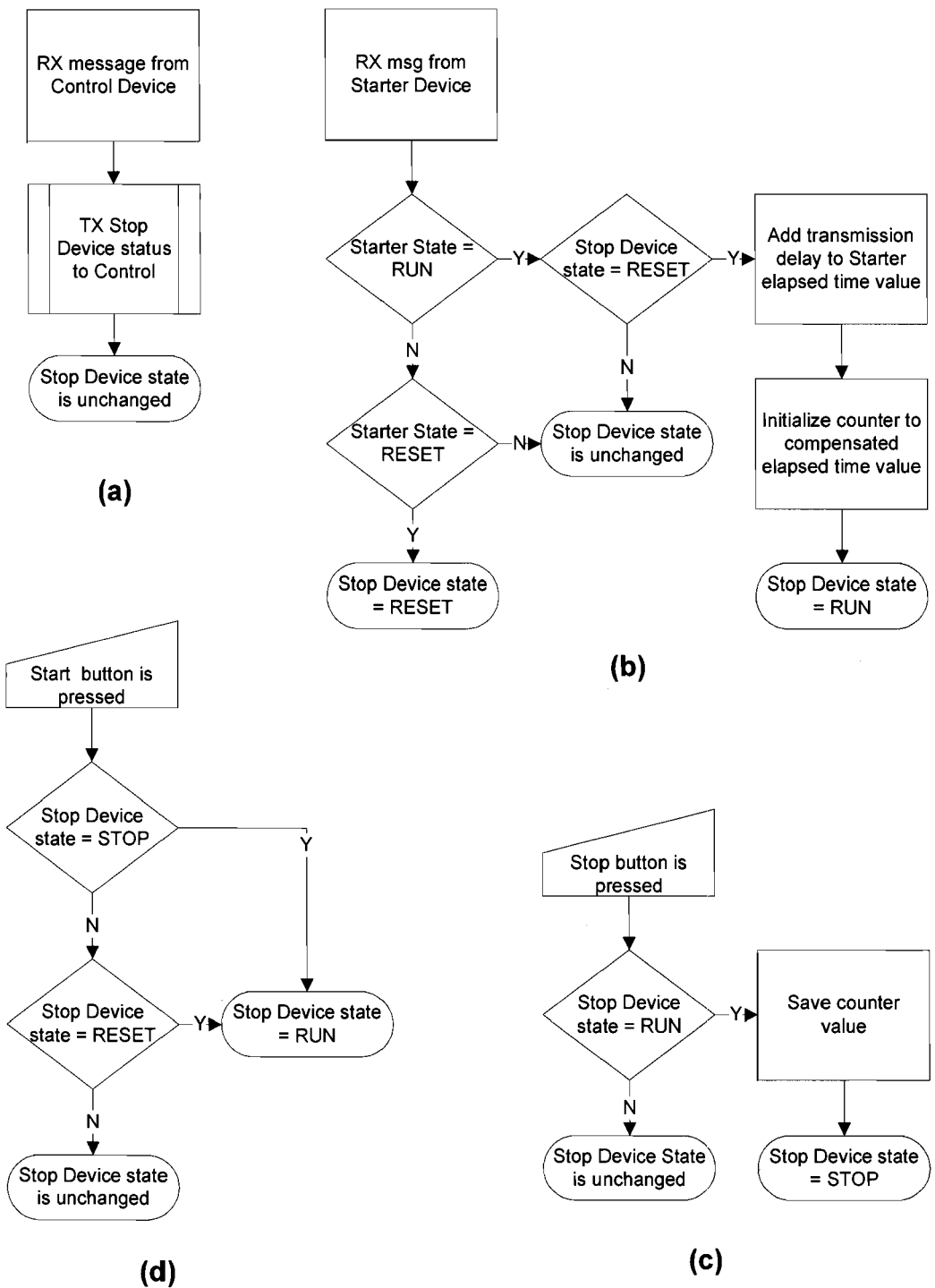
FIGS. 7a-7d provide example logical processes for stop devices in a system according to the present invention.
Figure 8:
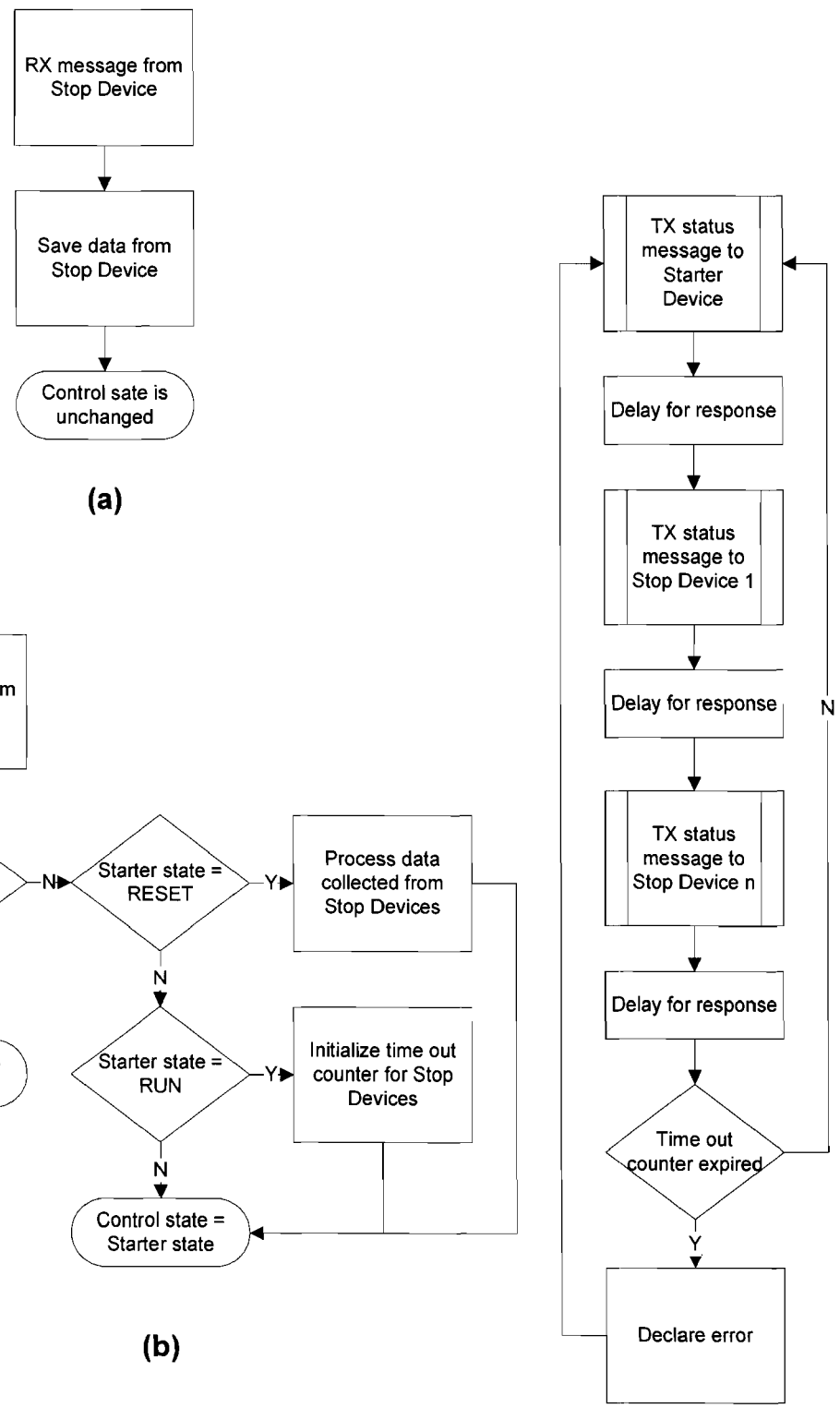
FIGS. 8a-8c provide example logical processes for a control device in a system according to the present invention.
Figure 9:
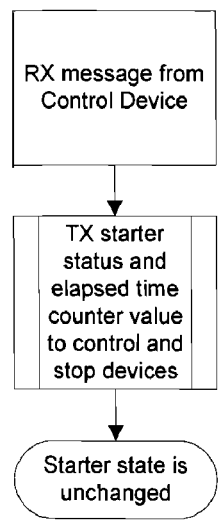
FIGS. 9a-9c provide example logical processes for a start device in a system according to the present invention.
Figure 9:
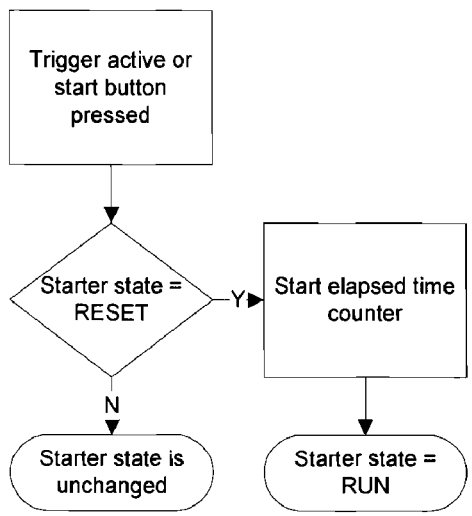
Figure 9:
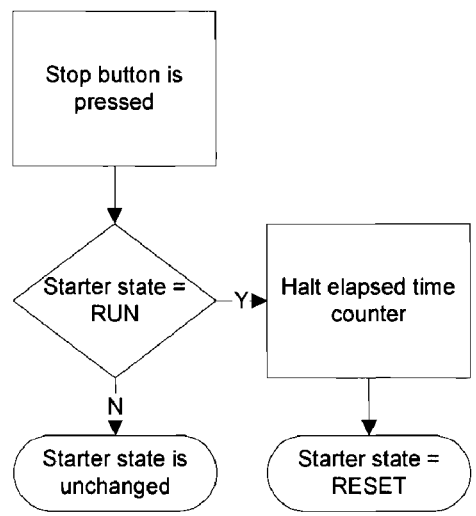

FIG. 6 illustrates one available embodiment of a device suitable for multiple purposes, depending on configuration and programming options. The generalized device (60) contains a microcontroller (61) having local memory (FLASHRom, RAM, cache, etc.), data buffers, at least one hardware timer, timer-controlled I/O, digital I/O, and analog to digital converter, one or more communications ports, and one or more specific device interfaces. There are a wide variety of available microcontrollers which provide most or all of these functions in a single chip, or in a set of chips. The generalized device (60) also is optionally provided with signal buffers, signal conditioning circuits, communications drivers, and a wireless interface such as an RF interface or an optical interface.

These interfaces may be configured and interconnected to external devices, connections, or cables, and the microcontroller maybe be loaded with appropriate firmware, to yield a function-specific device as shown in the following Table:

TABLE

Example Device Interconnects

| Start Device | |
|---|---|
| Signals (62) | Start input, relay or button |
| Signals (63) | Display/LEDs |
| Signals (64) | Battery |
| Communications (65) | Not dedicated |
| Wireless I/F (66) | Wireless Network |

| Stop Device | |
|---|---|
| Signals (62) | Stop input, relay or button |
| Signals (63) | Display/LEDs |
| Signals (64) | Battery |
| Communications (65) | Not dedicated |
| Wireless I/F (66) | Wireless Network |

| Console Device | |
|---|---|
| Signals (62) | Not dedicated or Keypad/Keyboard/Controls |
| Signals (63) | Display/LEDs |
| Signals (64) | Battery/DC power |
| Communications (65) | Personal Computer/PDA/etc. |
| Wireless I/F (66) | Wireless Network |

| Timer Device | |
|---|---|
| Signals (62) | Start/Restart buttons |
| Signals (63) | Display/LEDs |
| Signals (64) | Battery/DC power |
| Communications (65) | Display |
| Wireless I/F (66) | Wireless Network |

| Control and Data Acquisition Device | |
|---|---|
| Signals (62) | PWM, switches, relays, etc. |
| Signals (63) | Relays, switches, TTL |
| Signals (64) | Voltage, pressure, position, temperature, etc. |
| Communications (65) | serial comm, USB, network |
| Wireless I/F (66) | Wireless Network |

In the Table, references to display, LEDs, buttons, etc., are meant to indicate human interface devices in general, including but not limited to other forms of display (e.g. LCD, CRT, etc.), forms of audible output (e.g. speaker, buzzer, annunciators, etc.), and other forms of human input (e.g. mouse, trackball, keyboard, etc.).

Suitable Computing Platform

In one available embodiment of the invention, one or more components of the system are realized using custom circuitry, such as a printed circuit board assembly, a custom integrated circuit, a programmed logic device, a custom microcontroller-based circuit, or combination of two or more of these.

In another available embodiment of the present invention, the logical processes of the invention are realized in part or whole as software functionality executed by a suitable computing platform such as personal computers, web servers, and web browsers. These common computing platforms can include personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 2A:
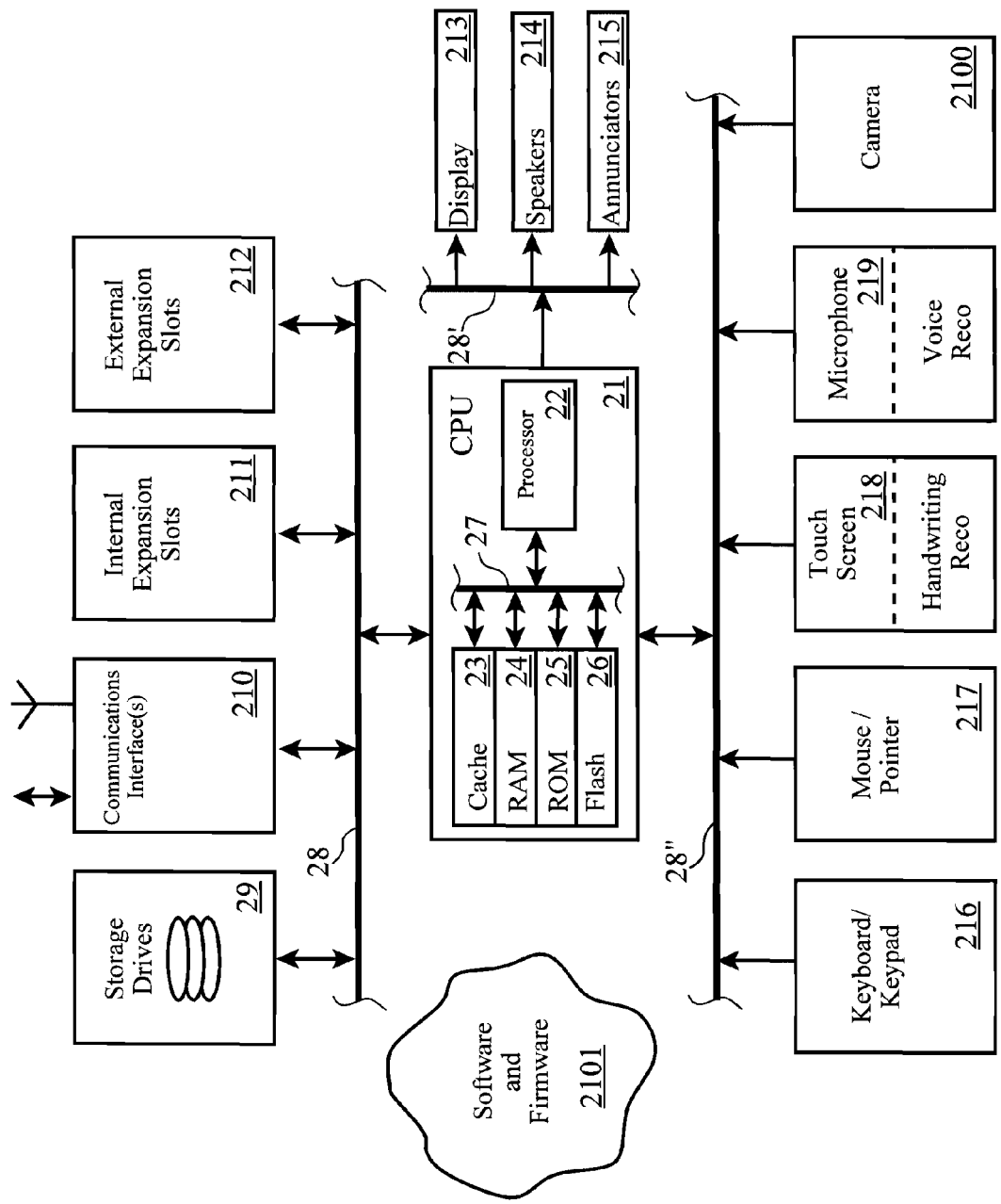
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
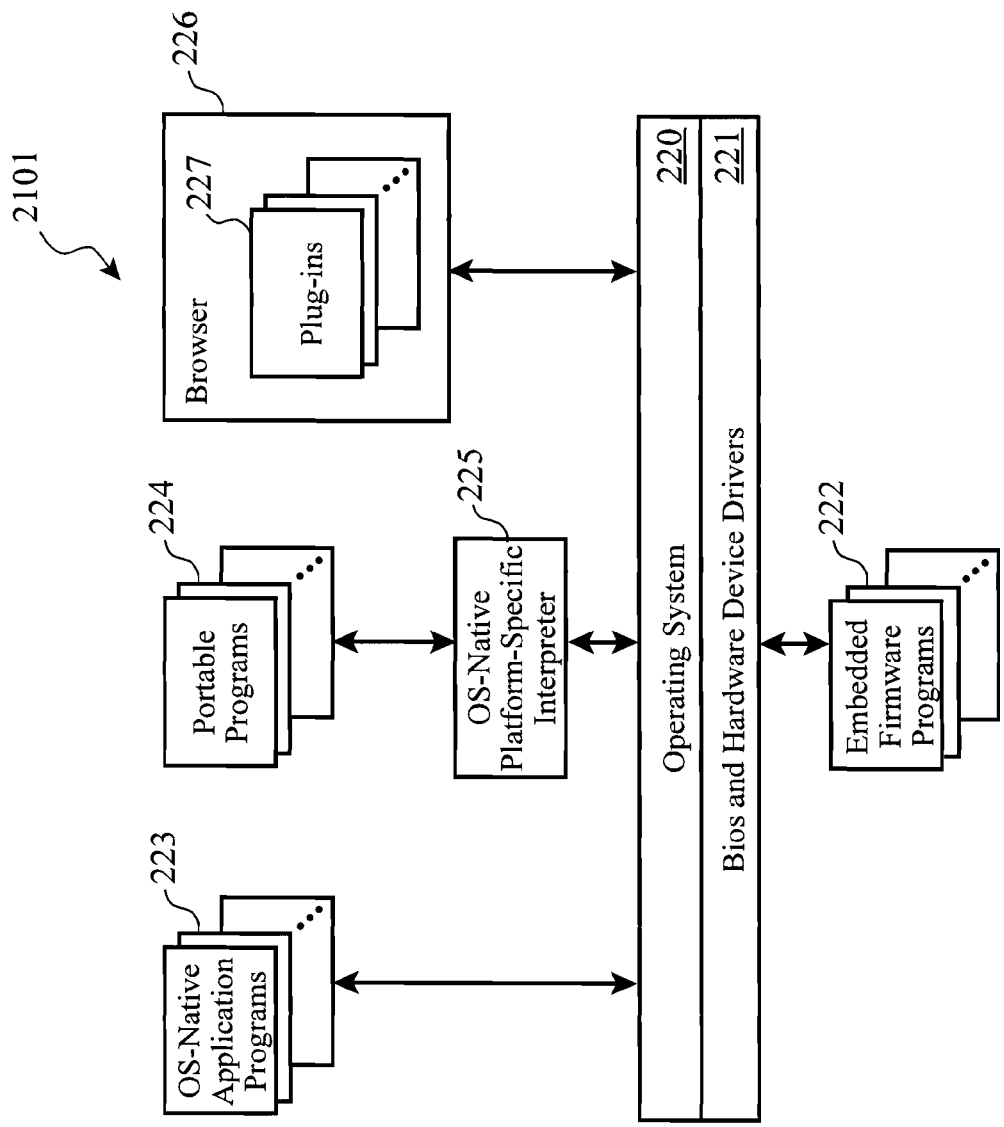

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2 ™, IBM AIX™, open source LINUX, Apple's MAC OS™, or other platform specific operating systems. Smaller devices such as PDA's and wireless telephones may be equipped with other forms of operating systems such as realtime operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods optionally implemented as software and firmware on such a computing platform. It will be readily recognized by those skilled in the art that the following methods and processes may be alternatively realized as hardware functions, in part or in whole, without departing from the spirit and scope of the invention.

Computer Readable Media

In one embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from a the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 3A:
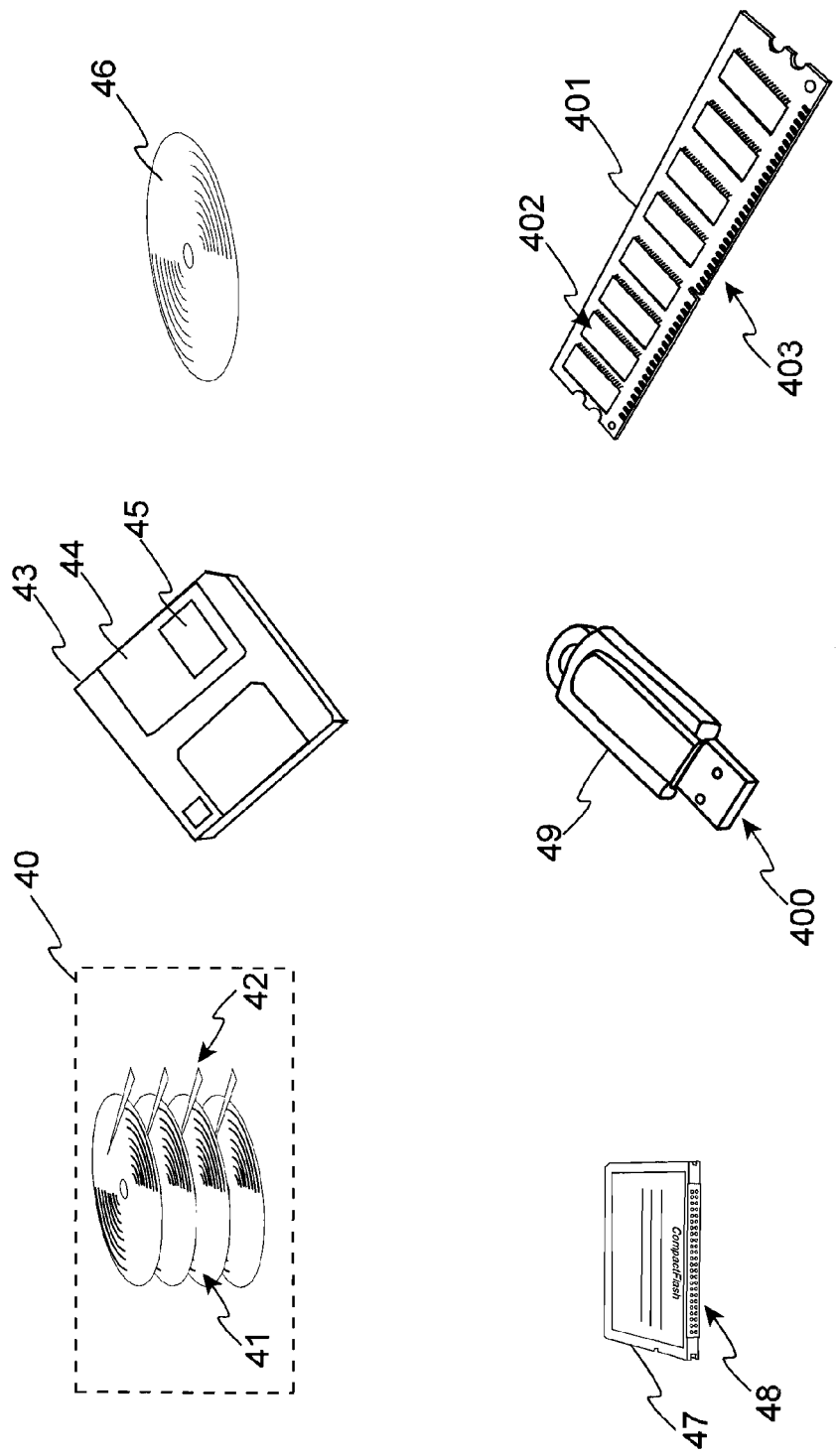
FIGS. 3a, 3b and 3c, illustrate computer readable media of various removable and fixed types, computer-readable signal transceivers, and parallel-to-serial-to-parallel signal circuits.

FIG. 3a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401)

having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 3B:
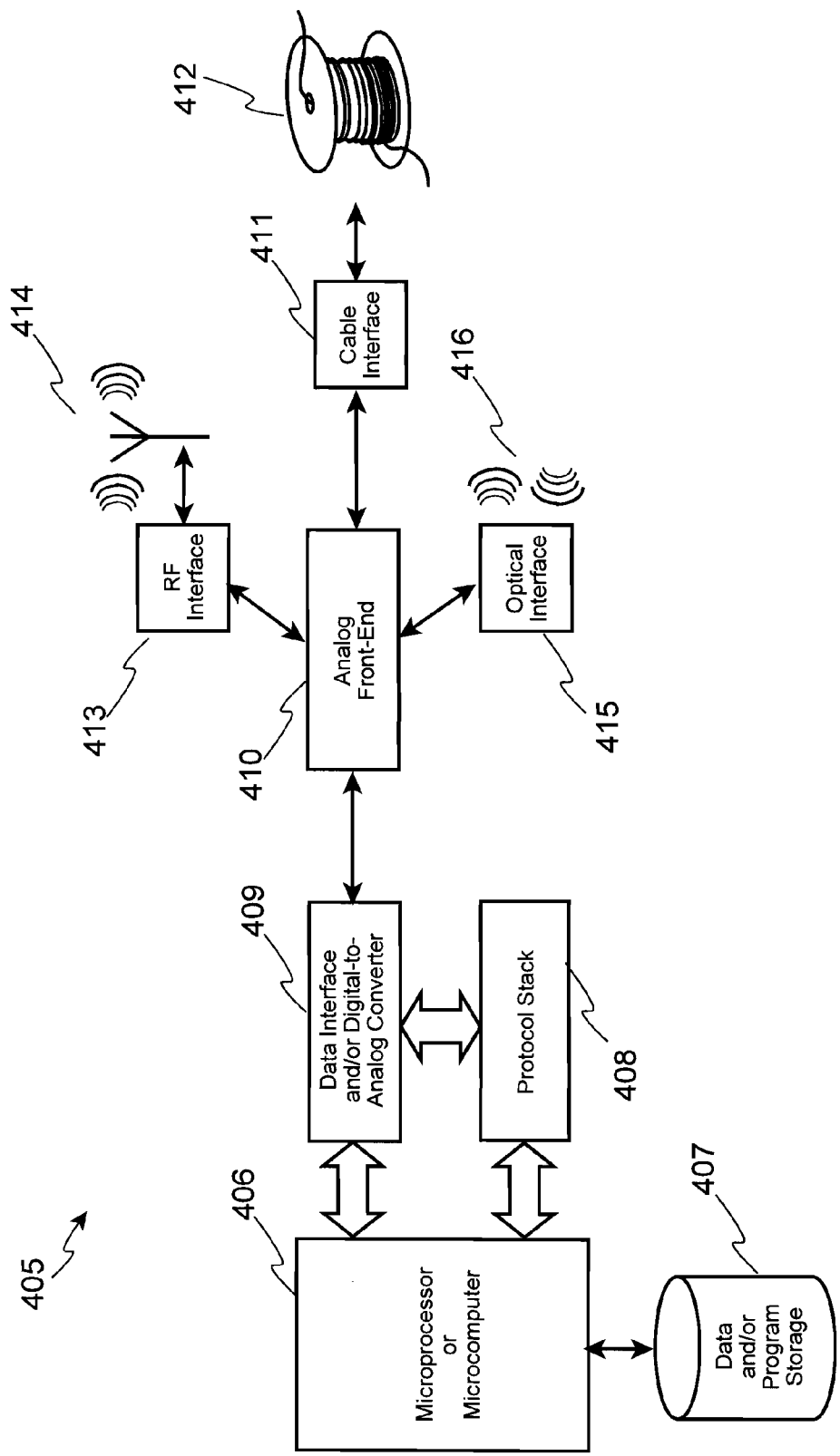
Figure 4:
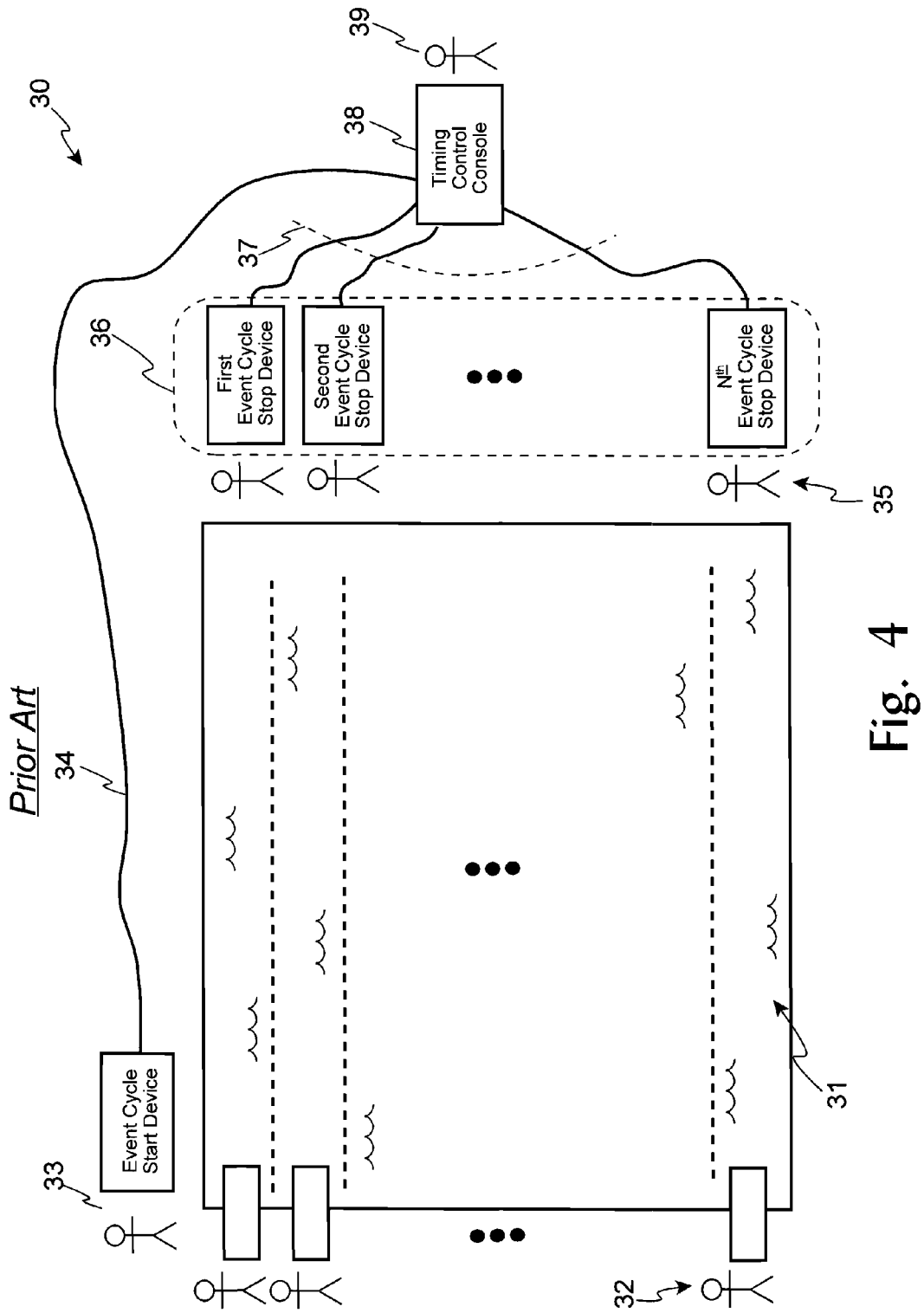
FIG. 4 illustrates a well known swimming event timer system.

Turning now to FIG. 3b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB Flash-Drive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-peripheral embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electro-magnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or InfraRed Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 3C:
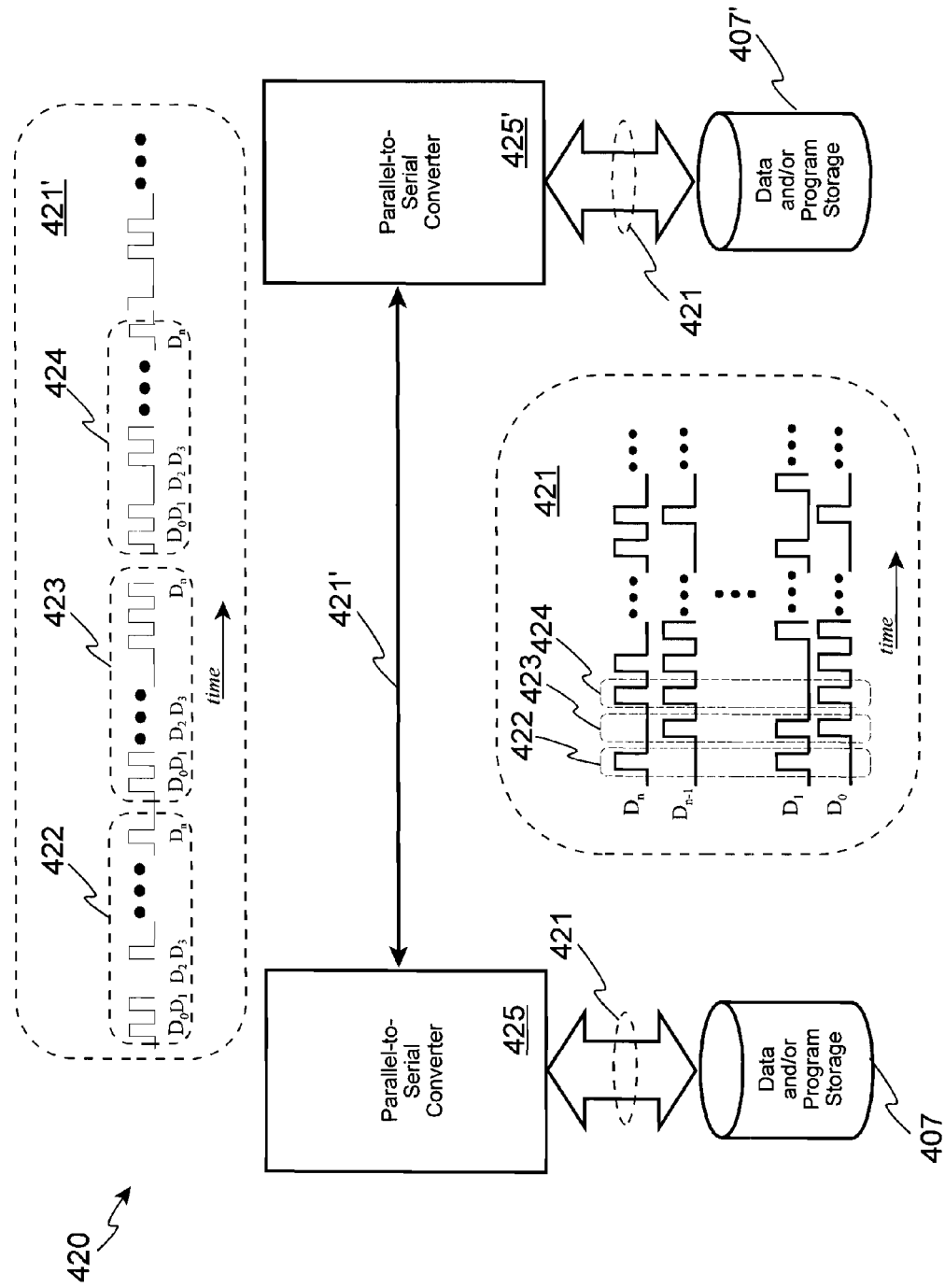

FIG. 3c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as an RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit D0-Dn being on a bus or signal carrier simultaneously, where the "width" of the data unit is n−1. In some systems, D0 is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

CONCLUSION

While the foregoing disclosure of the invention has employed both generalized processes, systems, and components as well as specific illustrative examples, and while certain details of a preferred embodiment and multiple alternate and enhanced embodiments have been provided, it will be recognized by those skilled in the art that certain variations, substitutions, or alternations may be made without departing from the spirit and scope of the invention, including but not limited to use of alternate programming languages and methodologies, alternate computing platforms, and equivalent data structures and logical processes.

I claim:

1. An event timing system comprising:
a start device in an area of a multi-contestant competitive swimming event which establishes a single authoritative start time upon activation by a starting official, runs a cycle timer beginning at the single authoritative start time, and which attempts to resynchronize a plurality of stop devices by wirelessly broadcasting within an area of the swimming pool a plurality of start messages;

a plurality of stop devices within the area of the competitive swimming event, each of the contestants being assigned to a swim lane wherein two or more stop devices are assigned to each swim lane, each stop device being operated by a stop official, having a local stop timer synchronized or resynchronized to the single authoritative start time using a value from at least one of the start messages, and each stop device wirelessly transmitting a stop message responsive to operation of a stop trigger by a stop official, each stop message having a stop time parameter equal to a current value of a local stop timer upon stop trigger operation; and a control device within the area of the competitive swimming event which, responsive to receipt of the stop messages, produces a recording of one or more stop time parameters, wherein all of the recorded stop time parameters are synchronized or resynchronized to the single authoritative start time.

2. The system as set forth in claim 1 further comprising a missed-acknowledgment message broadcast by the control device upon failure to receive an acknowledgment from all of the stop devices within a maximum delay from receiving the start message.

3. The system as set forth in claim 2 wherein the maximum delay for receiving acknowledgment from all stop devices is compensated for message transmission delay.

4. The system as set forth in claim 1 wherein:

the start device comprises an event cycle start trigger, a wireless message transceiver, and a cycle timer, the start device being configured to:
  respond to activation of the start trigger by establishing a cycle start time, start the cycle timer running, and transmit a start message with a time parameter equal to the cycle start time;
  respond to receipt of a missed-acknowledgment message by transmitting a start message with a time parameter equal to a current value of the running cycle timer responsive;

the stop devices are separate from the start device, and comprise a wireless message transceiver, a local stop timer, a stop device identifier, and an event cycle stop trigger, the stop device being configured to:
  respond to receipt of a start message by:
    initializing the local stop timer according the time parameter in the received start message;
    enabling the local stop timer to run; and
    transmitting an acknowledgment message with a device identifier; and
  respond to activation of the stop trigger by transmitting a stop message with a device identifier and a stop time parameter equal to a current value of the local stop timer; and the control device comprises a wireless message transceiver, a control timer, and a list of device identifiers, the control device being configured to:
  respond to receipt of a start message by:
    initializing the control timer for a maximum timeout delay; and
    transmitting a missed-acknowledgment message upon failure to receive an acknowledgment; and
  respond to receipt of a stop message by recording the stop time value.

5. The system as set forth in claim 4 wherein the start trigger comprises a button.

6. The system as set forth in claim 4 wherein the start trigger comprises an electronic signal from a human interface device.

7. The system as set forth in claim 4 wherein the start trigger comprises a computer signal.

8. The system as set forth in claim 4 wherein the stop trigger comprises a button.

9. The system as set forth in claim 4 wherein the stop trigger comprises a computer signal.

10. The system as set forth in claim 4 wherein the start device is disposed outside a field of competition, operable by a start official; wherein the stop devices are disposed in or near a field of competition; and wherein the control device is disposed near a judging table or booth.

11. The system as set forth in claim 1 wherein the control device is further configured to record a plurality of stop time values received in plurality of stop messages.

12. The system as set forth claim 1 further comprising an output for the recorded stop times.

13. The system as set forth in claim 12 wherein the output is a display.

14. The system as set forth in claim 12 wherein the output is a computer interface.

15. The system as set forth in claim 1 wherein the control device is further configured to compare the plurality of recorded stop times and to indicate which record stop time meets a predetermined criteria.

16. The system as set forth in claim 1 wherein the start device is further configured to resynchronize the stop devices by broadcasting an updated start message containing an elapsed time value since the single authoritative start time on a periodic basis.

17. The system as set forth in claim 1 wherein the start device is further configured to resynchronize the stop devices by broadcasting an updated start message containing an elapsed time value since the single authoritative start time on a randomly-timed basis.

18. An automated method comprising:

by a start device in an area of a multi-contestant competitive swimming event:
  establishing a single authoritative start time upon activation by a starting official,
  running a cycle timer beginning at the single authoritative start time, and
  attempting to synchronize and resynchronize a plurality of stop devices by wirelessly broadcasting within an area of a swimming pool a plurality of start messages by a plurality of stop devices within the area of the competitive swimming event, each of the contestants being assigned to a swim lane wherein two or more stop devices are assigned to each swim lane, each stop device being operated by a stop official:
  synchronizing or resynchronizing a local stop timer to the single authoritative start time from at least one of the start messages; and
  wirelessly transmitting a stop message responsive to activation of a stop trigger by a stop official subsequent to the initialization, each stop message having a stop time parameter equal to a current value of a local stop timer upon stop trigger operation; and by a control device within the area of the competitive swimming event, responsive to receiving the stop messages, producing a recording of one or more stop time parameters;

wherein all of the recorded stop time parameters are synchronized or resynchronized to the single authoritative start time.

19. The method as set forth in claim 18 further comprising by a control device, broadcasting a missed-acknowledgment message upon failure to receive an acknowledgment from all of the stop devices within a maximum delay from receiving the start message.

20. The method as set forth in claim 19 wherein the control device further compensates the maximum delay for message transmission delay.

21. The method as set forth in claim 18 wherein the resynchronization by the start device comprises broadcasting an updated start message containing an elapsed time value since the single authoritative start time on a periodic basis.

22. The method as set forth in claim 18 wherein the resynchronization by the start device comprises broadcasting an updated start message containing an elapsed time value since the single authoritative start time on a randomly-timed basis.

* * * * *